Nov. 18, 1941.  R. A. GOEPFRICH  2,262,843
MASTER CYLINDER FOR BRAKES
Filed March 10, 1938  2 Sheets-Sheet 1

INVENTOR
RUDOLPH A. GOEPFRICH
BY Jerome R. Cox
ATTORNEY

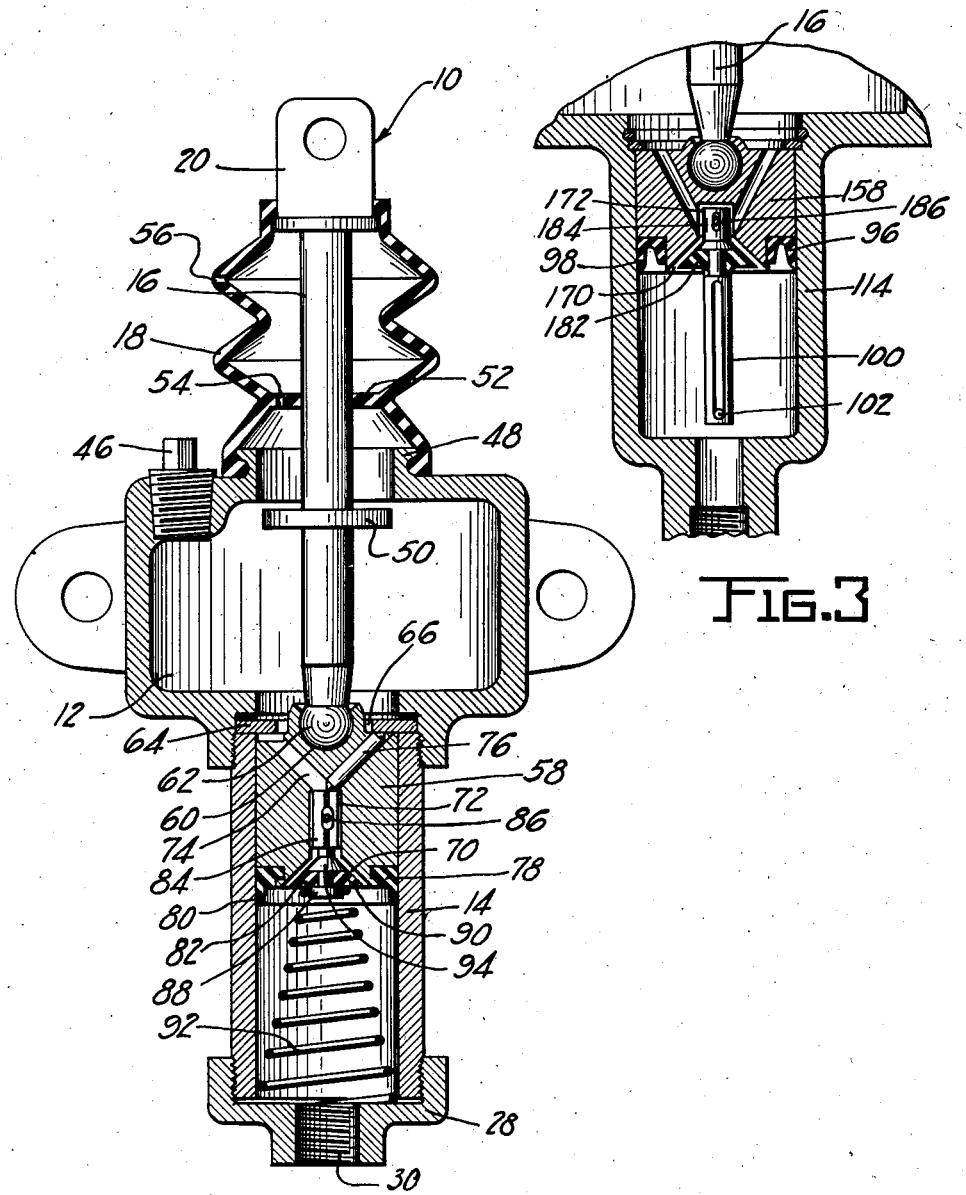

Patented Nov. 18, 1941

2,262,843

UNITED STATES PATENT OFFICE 2,262,843

MASTER CYLINDER FOR BRAKES

Rudolph A. Goepfrich, South Bend, Ind., assignor to Bendix Products Corporation, South Bend, Ind., a corporation of Indiana Application March 10, 1938, Serial No. 195,021

4 Claims. (Cl. 60—54.6)

This invention relates to braking systems of the hydraulic or fluid pressure type and more particularly to devices for producing fluid pressure to operate such braking systems.

In conventional fluid braking systems, the cylinder of the fluid pressure producing device is generally connected to the fluid reservoir by two ports known in the art as the supply port and the compensating port. The latter (compensating) port is usually located so that when the piston is in its maximum retracted position, the port is slightly ahead of a flexible cup seated on the piston head. As the piston travels on its compression stroke the resultant pressure at the head of the piston extends the flexible cup. This expansion of the cup retards the travel of the piston as the cup passes the compensating port. Sometimes the movement past the port even tears the cup. It is the aim of the invention of my copending application Serial No. 107,239, filed October 23, 1936 issued on June 27, 1939, as Patent No. 2,163,874, and also the object of the invention disclosed herein, to overcome this undesirable condition. Application Serial No. 371,074, filed December 21, 1940 is a division of this application.

An object, therefore, of this invention is to provide a fluid pressure producing device wherein the cylinder is constructed in such a manner as to obviate any undesirable opening into the fluid reservoir tending to be injurious to the piston cup.

A further object of the invention is to provide a fluid pressure producing device having a novel piston permitting by-passing of fluid from the reservoir through itself when the piston is in its retracted position, or during its retracting stroke.

A still further object of this invention is to provide a substantially shorter piston of this type than pistons heretofore proposed or used. Such a piston is simpler in construction, the cylinder bore required is relatively shorter, and the entire fluid pressure producing device consequently takes up less space in the vehicle with the added feature of ease of construction of the entire unit at a substantially reduced cost of manufacture.

Other objects and desirable particular constructions and arrangement of parts will become apparent upon reference to the following detailed description of the three illustrative embodiments shown in the accompanying drawings, in which:

Figure 2 is a side elevational view in section of my novel vertical master cylinder showing the piston as in its retracted position;

Figure 3 is a fragmentary sectional view showing a modification of the piston and piston valve of Figure 2.

Reference is made to the drawings for a more detailed description and particularly to Figure 2 which shows the preferred form of my invention constituting a vertical master cylinder.

Figure 1:
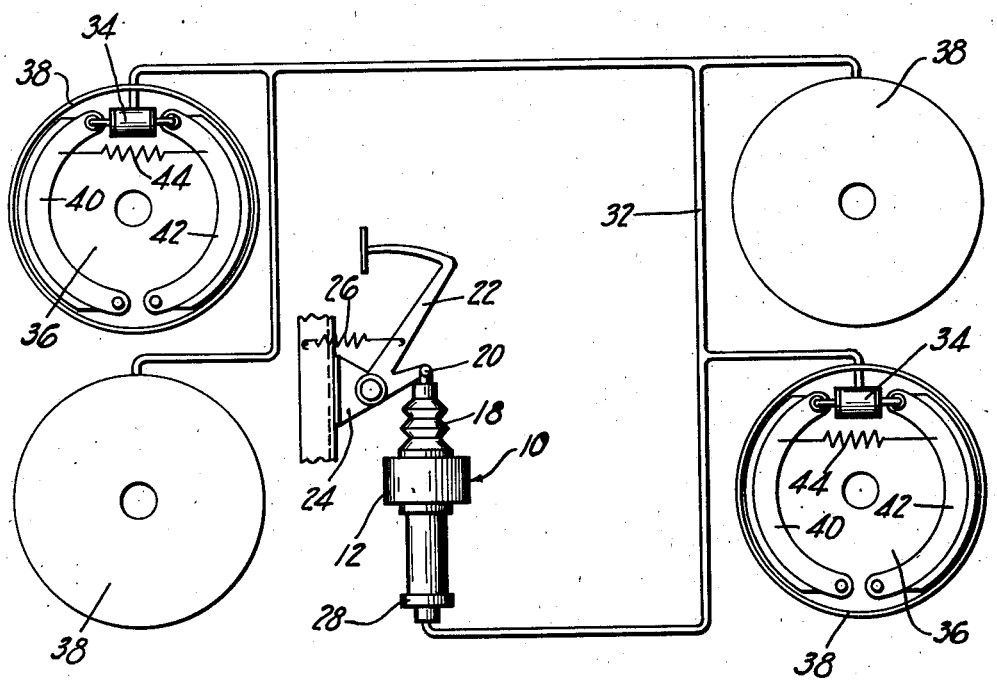
Figure 1 is a diagrammatic illustration of a fluid brake system embodying my invention.

My novel vertical master cylinder is shown incorporated with a general braking system for a vehicle in Figure 1. As illustrated my master cylinder is indicated generally by the reference numeral 10 having a fluid reservoir 12, a depending cylinder 14 in axial alignment and communicating with the reservoir, and a flexible boot 18 sleeved about the rod 16.

The rod 16 has attached to itself at its free end the clevis 20 to which is pivotally connected a foot pedal 22 pivoted on a fixed support 24 and having a retractile spring 26 also connected to a fixed support. As pressure is applied to the foot pedal 22 the force is transmitted to the clevis 20 actuating the rod 16 causing the consequent application of the brakes to the system in a manner to be hereinafter more fully described.

The depending cylinder 14 has both of its ends threaded externally, the upper end being threaded into the lower portion of the fluid reservoir 12 and the other receiving a cap 28 having a central threaded bore communicating with the inner portion of the cylinder and forming the discharge port 30 therefor.

A fluid pressure delivery pipe 32 suitably connected to the discharge port 30 of the master cylinder 10 has conduits connected respectively to fluid pressure actuated motors 34 arranged in pairs; one pair for the actuation of the brakes associated with the front wheels of the vehicle, and the other for actuation of the brakes associated with the rear wheels of the vehicle.

The brakes may be of the standard type each including a fixed support or backing plate 36, a rotatable drum 38 associated with the backing plate, a pair of corresponding brake shoes 40 and 42 pivoted on the backing plate, and pressure actuated motors 34 mounted on the backing plate 36 between each pair of shoes and operative to actuate the shoes into engagement with the braking surface of the drum 38 against the resistance of a retractile spring 44 connecting the shoes.

The fluid reservoir 12 is provided with a filling opening receiving the plug 46 and has at its upper end a substantially decreased extending hollow cylindrical portion adapted to receive the rod 16 and ending in a slightly increased outwardly flanged portion or shoulder 48. The latter acts as an abutment for the retainer of one end of the flexible boot 18 having its other end securely fastened about the clevis 20. Also formed integrally with the boot 18 is a coaxially mounted baffle 52 surrounding the rod 16 giving a seal-tight fit and having an atmospheric vent 54 communicating with another vent 56 of the boot and with the fluid reservoir.

The vertical rod 16 extends into the reservoir 12 at its central axis. The rod carries below the baffle 52 another circular baffle 50 so designed that when the system is in its normal rest position the baffle 50 will rest below the top open end of the reservoir thus defining a chamber which retards the resultant splashing of the fluid when the rod 16 is returning to its normal rest position subsequent to the releasing of the foot pedal.

The cylinder 14 has a reciprocable piston 58 having a substantially decreased slightly extending portion at its rear carrying a recess 60 adapted to receive the ball 62 formed on the lower end of the rod 16. The ball is suitably secured in the socket or recess so that the rod and piston may move in unison.

In its retracted or rest position the piston 58 rests against a washer 64 having a central opening forming an annular recess 66 communicating with the by-pass passage 72 of the piston through angular passages 74.

The head of the piston 58 is formed with a frustro-conical recess 70 and the by-pass 72 communicating with the angular passages 74. These latter passages communicate with the fluid reservoir 12 by virtue of the annular passage 66 formed by the washer 64 and the rear body portion of the piston 58.

The head of the piston 58 is provided with a rubber cup 78 having slightly outwardly flaring lips or flanges 80 which upon the compression stroke tend to distend against the inner walls of the cylinder 14 so as to provide a seal-tight fit prohibiting the escape of any of the fluid upon such compression stroke.

Formed to fit within the frustro-conical recess 70 of the piston 58 is a valve 82 having slidable stem 84 in the by-pass passage 72. The stem is suitably channeled so as to provide for the free flow of fluid through the by-pass 72 to the head of the cylinder 14 and is longitudinally slotted for the reception of a retaining pin 86.

One of the angular passages 74 in the rear of the piston 58 is provided with a pin 76 which rests at one of its ends against the washer 64 when the piston is in its retracted position and tends to trip the valve 82 when in that position to permit communication of the fluid from the reservoir to the head of the piston. This arrangement does away with the usual ports in the walls of the cylinder and permits relatively free movement of the rubber cup 78 on the piston head.

The head of the valve 82 has an extension 88 and a leak-proof washer 90 sleeved on the extension and retained against displacement by the extension and has a rim conforming to the wall of the frusto-conical recess 70 so as to effectively seal the valve when it is in its closed position on the compression stroke. Aiding its closure is also provided a light spring 92 resting against the extension 88 at one end and the head of the cylinder 14 at its other end.

The valve 82 is formed with a conical metallic head 94 arranged to contact the frustro-conical recess 70 and form a primary seal thus relieving the rubber washer 90 of cutting pressure.

In its operation as the foot pedal lever 22 is depressed, the force is transmitted through the clevis 20 to the rod 16 which in turn starts the piston 58 on its compression stroke. The pressure created by the fluid at the head of the piston 58 with the aid of the spring 92 retains the valve 82 in its seat prohibiting any back flow. The compression stroke of the piston is limited by the baffle 50 of the rod 16 when the baffle contacts the washer 64.

The resultant pressure of the compression stroke causes flow of fluid through the discharge port 30 to the conduits 32 and into the motors 34 causing the movement of the shoes 40 and 42 against the force of the retractile spring 44.

As the foot pedal 22 is released the rod 16 and piston 58 travel to their retracted position. The retaining pin 86 holds the valve 82 and avoids complete displacement should vacuum be created on the upward stroke at the head of the piston. As the piston reaches its maximum retracted position, the pin 76 at its rear contacts the stem 84 of the valve tripping it off its seat to permit inflow of fluid from the reservoir should any have been lost in the system during the compression stroke.

In the modification of Figure 3, the piston 158 has a decreased circumferential portion at its head receiving the rubber washer 96 having lips 98 which spread against the walls of the cylinder 114 upon the compression stroke providing a seal-tight fit against any back-flow.

The frustro-conical recess 170 in the head of the piston 158 receives the valve 182 having the stem 184 slidable in the by-pass passage 172 and having a longitudinally slotted extended portion 100 receiving the retaining pin 102 passing through the cylinder 114. The stem 184 is also longitudinally slotted to receive a retaining pin 186.

The function of these pins is such that upon the compression stroke, the valve 182 is seated in the conical recess of the piston head. Its tripping occurs when upon the return stroke the pin 102 seats at the end of the longitudinal slot of the extension 100. The latter is so designed that upon reaching the retracted position the valve 182 is held slightly from its seat in the piston head permitting communication of the reservoir with the cylinder head. The pin 186 on the other hand performs the function of carrying the valve 182 with the piston on the return stroke prohibiting entire displacement of the valve resulting of vacuum created by the retracting piston.

In all other respects the device functions in the same manner as that of Figure 2 before described.

Figure 4:
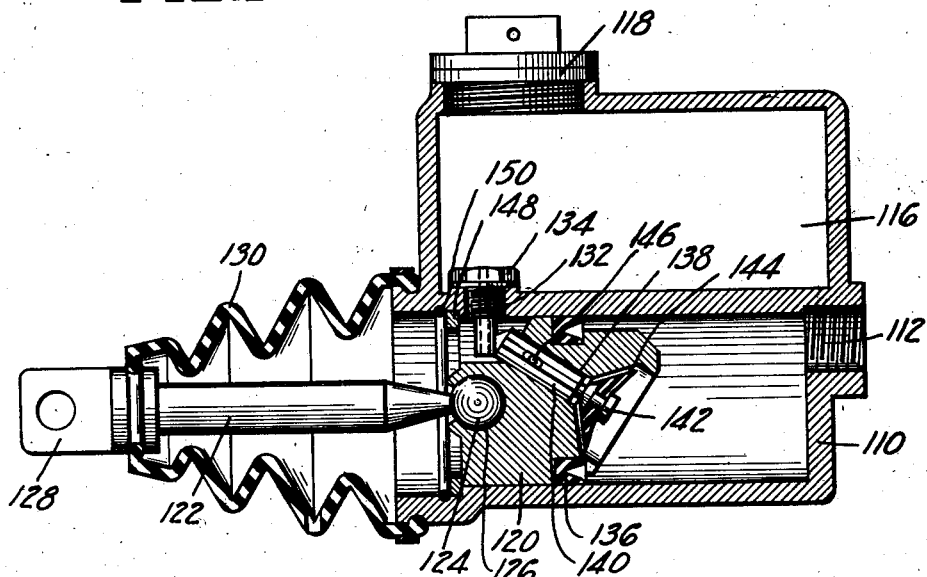
Figure 4 is a view in section showing a further modification of my invention as embodied in a horizontal master cylinder.

In the modification shown in Figure 4, there is shown a horizontal master cylinder having a cylinder 110 formed with a discharge port 112, the cylinder being integrally formed with the fluid reservoir 116 which has the vent plug 118 for filling.

The cylinder 110 receives a reciprocable piston 120 suitably connected to a rod 122 having at one of its ends a ball 124 fitted in a recess 126 at the rear of the piston and a clevis 128 at its other end.

A flexible boot 130 sleeved about the rod 122 and suitably fastened to the cylinder at one end and to the clevis 128 at the other end is provided to retain fluid therein and to be retractible with the rod 122.

The fluid reservoir 116 has a communication port 132 receiving a ported plug 134 extending into the cylinder 110.

The piston 120 is constructed with a grooved cutaway portion about its inner periphery so as to receive the rubber washer 136 having lips which upon the compression stroke distend so as to insure a seal-tight closure for the piston.

The piston further has a passage 138 formed angularly so as to receive the slidable grooved stem 140 of the conical valve 142 seated in the angular conical recess 144 of the piston head. The stem 140 is provided with a longitudinal slot adapted to receive a retaining pin 146.

The rear of the piston 118 is provided with a "cut-away" portion so as to permit the travel of the piston without interference of the extending channeled plug 134, and to permit communication of the reservoir 116 with the hollow boot 130. The rear of the piston is secured against rearward displacement by the washer 148 and split spring 150.

The channeled plug 134 serves the double purpose of acting as a communication port and as a tripping member for the valve 142 when the piston is in its maximum retracted position to compensate for any fluid that may have been lost throughout the system during the braking thereof.

In its operation this master cylinder is similar to that described in the preferred embodiment. With the actuation of the foot pedal 22, the piston 118 is sent on its compression stroke causing discharge of fluid through discharge port 112 to the system as shown in Figure 1.

While three illustrative embodiments have been described in detail, it is not my intention to limit the scope of the invention to those particular embodiments, or otherwise than by the terms of the appended claims.

I claim:

1. A master cylinder having a piston formed with a passage therethrough and with a conical recess in its face into which said passage opens, a valve having a conical head adapted to seat in said recess and a seal carried by said head and adapted to seal against the wall of said recess and having a stem extending into said passage, means comprising a pin extending obliquely through said piston for opening said valve and means for operating said piston having a ball and socket connection with said piston concentrically of said piston.

2. A master cylinder having a piston formed with an oblique passage therein and with a concentric recess in its face into which said passage opens and from which said passage runs to a point on the upper face of said piston eccentric thereof, a valve having a head adapted to seat in said recess and a seal carried by said head and adapted to seal against the wall of said recess and having a stem extending into said recess, and means comprising a pin secured in said recess in said piston engaging a slot in said stem and preventing complete separation of said valve from said piston, in combination with stop means acting on said stem when the piston is retracted to unseat said valve.

3. A master cylinder having a piston formed with a concentric passage therein and with a concentric conical recess in its face into which said passage opens, a valve having a conical head adapted to seat in said recess and a seal carried by said head and adapted to seal against the wall of said recess and having a stem extending into said concentric passage, and means engaging said stem and preventing complete separation of said valve from said piston, in combination with an eccentric stop, a pin positioned in an oblique bore in said piston contacting with said stop at times and said pin acting on said stem in said concentric passage when the piston is retracted to unseat said valve.

4. A master cylinder having a piston formed with a concentric passage therethrough and with a conical recess in its face into which said passage opens, having also an oblique passage leading from said concentric passage, a valve having a conical head adapted to seat in said recess and a seal carried by said head and adapted to seal against the wall of said recess and having a stem extending into said concentric passage and means in said concentric passage engaging said stem and preventing complete separation of said valve from said piston, in combination with a stop and pin associated therewith acting on said stem when the piston is retracted to unseat said valve, and in combination with a piston rod connected by a concentric ball and socket connection with said piston.

RUDOLPH A. GOEPFRICH.